US012803117B2

(12) United States Patent
Chen

(10) Patent No.: US 12,803,117 B2
(45) Date of Patent: Nov. 17, 2026

(54) ELECTROCHEMICAL DEVICE AND ELECTRONIC DEVICE

(71) Applicant: Ningde Amperex Technology Limited, Ningde (CN)

(72) Inventor: Xiao Chen, Ningde (CN)

(73) Assignee: Ningde Amperex Technology Limited, Ningde City (CN)

( * ) Notice: Subject to any disclaimer, the term of this patent is extended or adjusted under 35 U.S.C. 154(b) by 607 days.

(21) Appl. No.: 18/366,988

(22) Filed: Aug. 8, 2023

(65) Prior Publication Data

US 2023/0395943 A1 Dec. 7, 2023

Related U.S. Application Data

(63) Continuation of application No. PCT/CN2021/076383, filed on Feb. 9, 2021.

(51) Int. Cl.

*H01M 50/474* (2021.01)
*H01M 10/0587* (2010.01)
*H01M 50/105* (2021.01)
*H01M 50/457* (2021.01)
*H01M 50/494* (2021.01)

(52) U.S. Cl.

CPC ..... *H01M 50/474* (2021.01); *H01M 10/0587* (2013.01); *H01M 50/105* (2021.01); *H01M 50/457* (2021.01); *H01M 50/494* (2021.01); *H01M 2220/30* (2013.01)

(58) Field of Classification Search

CPC ............. H01M 50/471; H01M 50/474; H01M 10/0587

See application file for complete search history.

(56) References Cited

U.S. PATENT DOCUMENTS

| | | | | |
|---|---|---|---|---|
| 10,530,012 | B2 * | 1/2020 | Maeda | C09J 7/10 |
| 2024/0010877 | A1 * | 1/2024 | Zhang | H01M 50/105 |

FOREIGN PATENT DOCUMENTS

| | | | | |
|---|---|---|---|---|
| CN | 202205852 | U | 4/2012 | |
| CN | 105742712 | A | 7/2016 | |
| CN | 206022548 | U | 3/2017 | |
| CN | 106797055 | A | 5/2017 | |
| CN | 107615549 | A | 1/2018 | |
| CN | 207183445 | U | 4/2018 | |
| CN | 109988522 | A * | 7/2019 | C09J 9/02 |
| CN | 210040429 | U | 2/2020 | |

(Continued)

OTHER PUBLICATIONS

Office Action issued on May 17, 2022, in corresponding Chinese Application No. 202180004502.X, 13 pages.

(Continued)

*Primary Examiner* — Amanda C. Walke

(74) *Attorney, Agent, or Firm* — Maier & Maier, PLLC

(57) ABSTRACT

An electrochemical device including a housing, an electrode assembly, and a first bonding piece. The electrode assembly is located in the housing. The first bonding piece bonds the housing and the electrode assembly together. A bonding strength between the first bonding piece and the housing is $F_1$, and a bonding strength between the first bonding piece and the electrode assembly is $F_2$, $5\% \leq F_1/F_2 \leq 70\%$, and $15\ N/m \leq F_1 \leq 500\ N/m$.

20 Claims, 9 Drawing Sheets

(56) References Cited

FOREIGN PATENT DOCUMENTS

| | | | | | |
|---|---|---|---|---|---|
| CN | 210668585 | U | 6/2020 | | |
| CN | 107615549 | B | 9/2020 | | |
| CN | 111876082 | A | 11/2020 | | |
| JP | 5441271 | B2 * | 3/2014 | .............. | C09J 7/241 |

OTHER PUBLICATIONS

International Search Report issued on Nov. 12, 2021, in corresponding International Application No. PCT/CN2021/076383, 6 pages.

* cited by examiner

ELECTROCHEMICAL DEVICE AND ELECTRONIC DEVICE

CROSS-REFERENCE TO RELATED APPLICATION

The present application is a continuation application of PCT application No. PCT/CN2021/076383, filed on Feb. 9, 2021, the content of which is incorporated herein by reference in its entirety.

TECHNICAL FIELD

This application relates to the field of energy storage, and in particular, to an electrochemical device and an electronic device containing the electrochemical device.

BACKGROUND

Electrochemical devices (such as a battery) are widely used in electronic products such as an electronic mobile device, an electric tool, and an electric vehicle, and people are imposing higher requirements on safety performance of the electrochemical devices. An electronic product in use is prone to mechanical abuse such as drop, collision, and vibration, thereby being vulnerable to a short circuit within the electrochemical device, causing failure, and reducing safety of the product in use.

SUMMARY

In view of the disadvantages of the prior art, it is necessary to disclose an electrochemical device that is conducive to improving the anti-drop performance and safety.

In addition, it is necessary to provide an electronic device containing the electrochemical device.

This application provides an electrochemical device, including a housing, an electrode assembly, and a first bonding piece. The electrode assembly is located in the housing. The first bonding piece bonds the housing and the electrode assembly together. A bonding strength between the first bonding piece and the housing is $F_1$, and a bonding strength between the first bonding piece and the electrode assembly is $F_2$, $5\% \leq F_1/F_2 \leq 70\%$, and $15\ N/m \leq F_1 \leq 500\ N/m$.

In this application, the first bonding piece is provided. In this way, the electrode assembly and the housing are bonded and fixed to each other, thereby suppressing the wobble of the electrode assembly in the housing during mechanical abuse (dropping, collision, or vibration), and reducing the hazards of electrolyte leakage, short circuit, or fire caused by the housing burst open. Moreover, because the current collector of the electrode plate of the electrode assembly is of relatively high hardness, this application sets $F_1$ and $F_2$ to satisfy specified conditions, so as to not only ensure firm bonding of the first bonding piece to the housing and the electrode assembly, but also ensure that the first bonding piece can be de-bonded from the housing in time to release a stress and reduce the hazard of tearing the current collector of the electrode plate in a case that the stress transmitted to the electrode assembly is relatively large when the electrode assembly wobbles in the housing and pulls the first bonding piece during mechanical abuse.

In some embodiments, $25\% \leq F_1/F_2 \leq 55\%$. In this case, the anti-drop performance of the electrochemical device is further improved.

In some embodiments, $30\ N/m \leq F_1 \leq 300\ N/m$. In this case, the safety performance of the electrochemical device is further improved.

In some embodiments, the first bonding piece includes a substrate layer, a first bonding layer and a second bonding layer, the first bonding layer and the second bonding layer are disposed on two sides of the substrate layer. The first bonding layer bonds the substrate layer to the housing. The second bonding layer bonds the substrate layer to the electrode assembly. By arranging the first bonding piece as a three-layer structure, the bonding strength is caused to be different between the two sides of the first bonding piece.

In some embodiments, the electrode assembly includes a first electrode plate, a second electrode plate and a separator. The separator is disposed between the first electrode plate and the second electrode plate. The electrode assembly is of a wound structure. In a winding direction, the electrode assembly includes a first section, a first bend section, a second section, and a second bend section that are connected sequentially. An outermost coil of the first section is the separator. The first bonding piece bonds the housing to the outermost coil of the first section. In this application, the separator is extended and the wound structure ends with the separator. The separator is of a higher roughness, and therefore, can increase the friction force between the electrode assembly and the first bonding piece, thereby increasing the bonding strength between the electrode assembly and the first bonding piece. In addition, this part of separator can form a protection layer to avoid a short-circuit hazard caused by wear and tear of the electrode plate inside the separator and effectively increase the capability of the electrode assembly in resisting mechanical shocks. Moreover, when the electrode assembly wobbles in the housing and pulls the separator, the separator is made of a material that is highly flexible, and therefore, is not prone to be torn under a stress, thereby alleviating the safety problems caused by potential tearing at the end part of the current collector of the electrode plate.

In some embodiments, in the winding direction, the width of the first bonding piece on the outermost coil of the first section is greater than or equal to 5 mm, so as to decrease the risk of weak bonding of the first bonding piece to the electrode assembly and the housing caused by deficiency in the width, suppress the wobble of the electrode assembly in the housing during mechanical abuse, and reduce the hazards of electrolyte leakage, short circuits, and fire caused by burst of the housing.

In some embodiments, in a winding direction, an end part of the separator is located at the first bend section. The first bonding piece is further adhered to the outermost coil of the first bend section and adhered to the end part of the separator. Therefore, the first bonding piece may also serve as an ending adhesive to fix the end part of the separator.

In some embodiments, the first bonding piece on the outermost coil of the first section is connected to the first bonding piece on the outermost coil of the first bend section, thereby increasing the area of bonding of the first bonding piece to the housing and the electrode assembly.

In some embodiments, in the winding direction, an end part of the separator is located at the second section. The first bonding piece is further adhered to the outermost coil of the first bend section and the outermost coil of the second section, and is adhered to the end part of the separator. Therefore, the first bonding piece may also serve as an ending adhesive to fix the end part of the separator.

In some embodiments, an outermost coil of the second section is the first electrode plate. The first electrode plate includes a first current collector and a first active material layer disposed on the first current collector. The first current collector includes a first surface. An outer surface of the outermost coil of the second section is the first surface. The first bonding piece is further adhered to the first surface. The outermost coil of the second section is the first electrode plate, and the hardness of the electrode plate is usually high, thereby increasing the hardness of the electrode assembly, increasing the capability of the electrode assembly in resisting mechanical shocks, and improving safety.

In some embodiments, in the winding direction, an end part of the first electrode plate is located at the second section. The first bonding piece is further adhered to the outermost coil of the second bend section and is adhered to the end part of the first electrode plate. Therefore, the first bonding piece may also serve as an ending adhesive to fix the end part of the first electrode plate.

In some embodiments, the electrochemical device further includes a second bonding piece. The second bonding piece bonds an outermost electrode plate of the first section together with the separator located outside the outermost electrode plate of the first section. Therefore, the outermost electrode plate of the first section is adhered and fixed to the separator located outside the outermost electrode plate of the first section.

In some embodiments, in a direction perpendicular to a winding axis of the electrode assembly, at an end of the electrode assembly, a projection of an edge of the first bonding piece is located between a projection of an edge of the first electrode plate and a projection of an edge of the separator. Therefore, the first bonding piece can fix the separator and reduce the short-circuit hazards caused by contact between the first electrode plate and the second electrode plate when the separator shrinks during mechanical abuse. In addition, this function of the first bonding piece can reduce the hazards of a decrease in the sealing strength or proneness to electrolyte leakage at a seal edge of the housing, where the hazards occur because a protruding part by which the first bonding piece protrudes beyond the separator enters the seal edge of the housing.

This application further provides an electronic device, including the electrochemical device. The electronic device further includes an accommodation chamber and a third bonding piece. The electrochemical device is disposed in the accommodation chamber. The third bonding piece bonds a housing oriented toward the first section together with the accommodation chamber. Therefore, when the electronic device is subjected to mechanical abuse, the third bonding piece may suppress the wobble of the electrochemical device in the accommodation chamber, and the first bonding piece can suppress the wobble of the electrode assembly of the electrochemical device in the housing, thereby reducing the hazards of electrolyte leakage, short circuits, or fire caused by the housing burst open, and improving safety.

LIST OF REFERENCE NUMERALS

Figure 1:
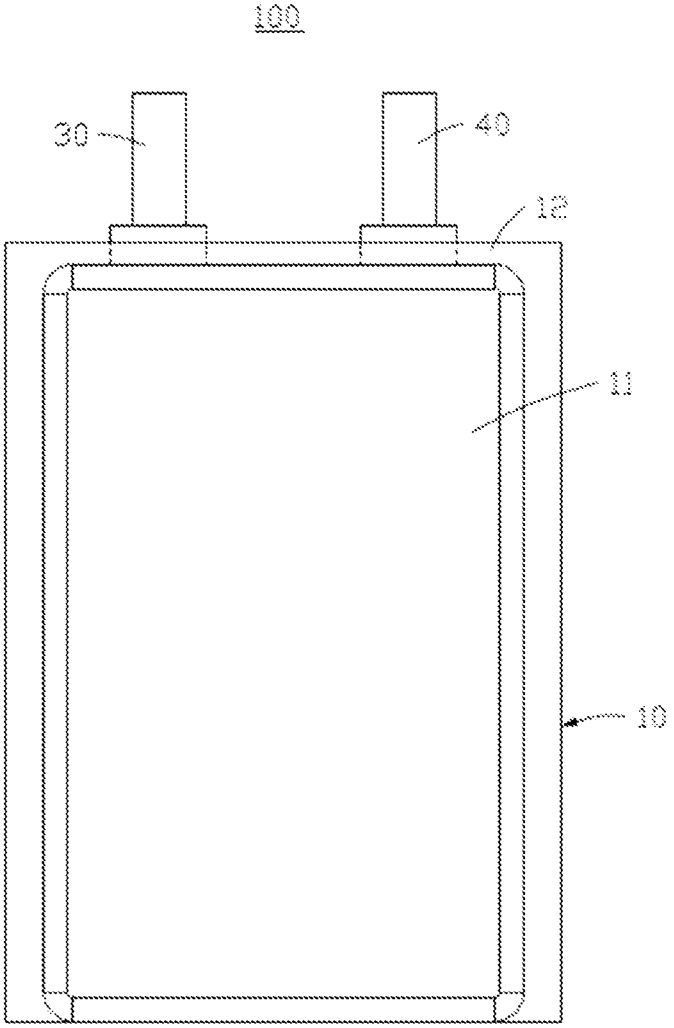
FIG. 1 is an overall schematic structural diagram of an electrochemical device according to an embodiment of this application.

Electronic device 1
Housing 10
Body portion 11
Seal edge 12
First sealing film 13
Second sealing film 14
Electrode assembly 20
First electrode plate 21
Second electrode plate 22
Separator 23
First tab 30
Second tab 40
First bonding piece 50
Substrate layer 51
First bonding layer 52
Second bonding layer 53
Second bonding piece 60
Head adhesive tape 90
End adhesive tape 91
Electrochemical devices 100, 200, 300, 400
Accommodation chamber 101
Third bonding piece 102
First pit 130
Second pit 140
First section 201
First bend section 202
Second section 203
Second bend section 204
First current collector 211
First active material layer 212
Second current collector 221
Second active material layer 222
First surface 2111
Second surface 2112
Edges 201, 2101, 2301
End parts 2100, 2200, 2300
Thickness direction H
Winding axis C
Direction perpendicular to the winding axis $D_2$
Winding direction $D_1$ Width W Lengths $L_1$, $L_2$, $L_3$ This application is further described below with reference to the following specific embodiments and the foregoing drawings.

DETAILED DESCRIPTION

The following describes the technical solutions in some embodiments of this application clearly in detail with reference to the drawings appended hereto. Evidently, the described embodiments are merely a part of but not all of the embodiments of this application.

Unless otherwise defined, all technical and scientific terms used herein bear the same meanings as what is normally understood by a person skilled in the technical field of this application. The terms used in the specification of this application are merely intended to describe specific embodiments but not to limit this application.

The following describes some embodiments of this application in detail with reference to drawings. To the extent that no conflict occurs, the following embodiments and the features in the embodiments may be combined with each other.

Figure 2:
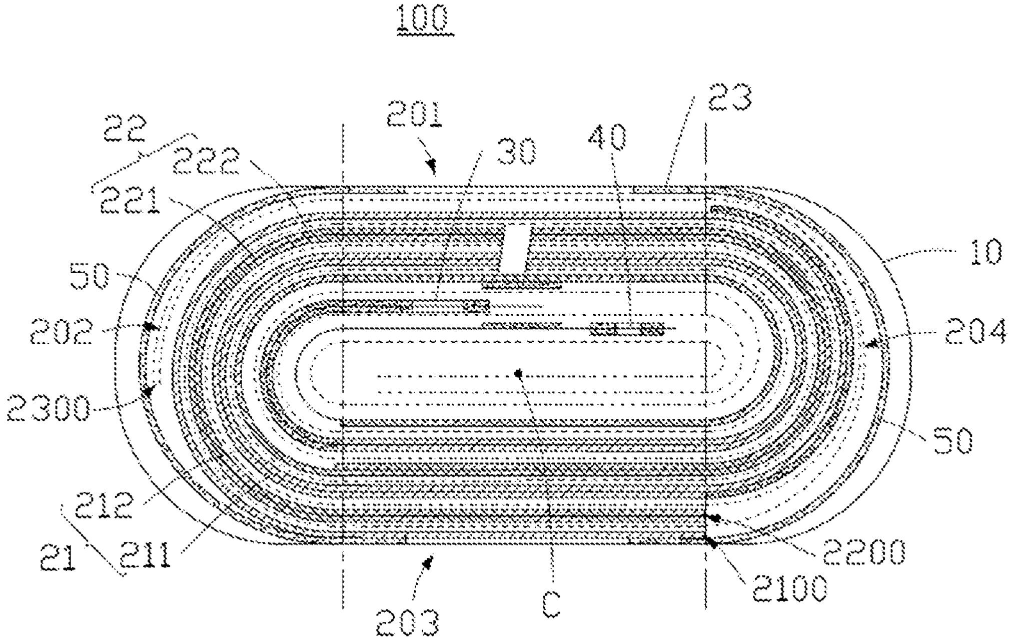
FIG. 2 is a sectional view of an electrochemical device in an implementation of this application.

Referring to FIG. 1 and FIG. 2, an embodiment of this application provides an electrochemical device 100, including a housing 10, an electrode assembly 20, and an electrolyte solution (not shown in the drawings). Both the electrode assembly 20 and the electrolyte solution are located inside the housing 10. The electrode assembly 20 includes a first electrode plate 21, a second electrode plate 22 and a separator 23. The separator 23 is disposed between the first electrode plate 21 and the second electrode plate 22. The separator 23 is configured to prevent direct contact between the first electrode plate 21 and the second electrode plate 22, so as to prevent a short circuit of the electrode assembly 20. In some embodiments, the electrode assembly 20 is of a wound structure. To be specific, the first electrode plate 21, the separator 23, and the second electrode plate 22 are sequentially stacked and wound to form the electrode assembly 20. In some other embodiments, the electrode assembly 20 may is of a stacked-type structure instead, in which the first electrode plate 21, the separator 23, and the second electrode plate 22 are stacked sequentially to form the electrode assembly 20. The type of structure is not limited in this application.

Figure 3:
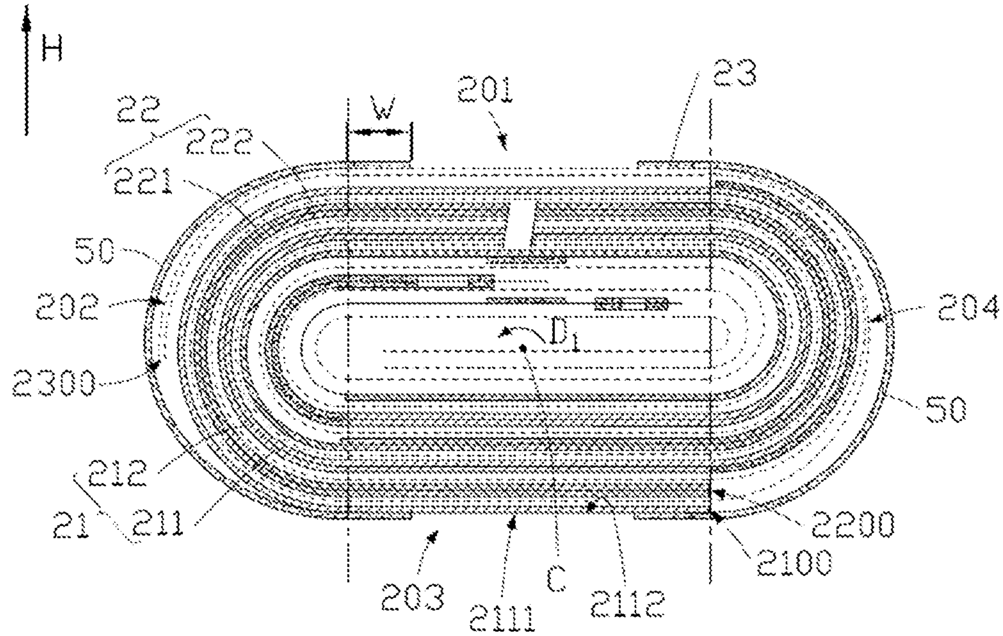
FIG. 3 is a sectional view of the electrochemical device shown in FIG. 2 and stripped of a housing according to some embodiments.

Still referring to FIG. 3, the first electrode plate 21 includes a first current collector 211 and a first active material layer 212 disposed on the first current collector 211. The second electrode plate 22 includes a second current collector 221 and a second active material layer 222 disposed on the second current collector 221. In some embodiments, the first electrode plate 21 is a positive electrode plate, and the second electrode plate 22 is a negative electrode plate. The first current collector 211 may be, but is not limited to, an aluminum foil or a nickel foil. The second current collector 221 may be, but is not limited to, a copper foil or a nickel foil.

In some embodiments, the separator 23 includes a porous substrate. In some embodiments, the separator 23 further includes a coating layer applied onto the porous substrate. The coating layer includes at least one of a binder or inorganic particles.

The porous substrate is a polymer film, a multilayer polymer film, or a non-woven fabric, which, in each case, is formed by any one of the following polymers or by a composite of two or more of the following polymers: polyethylene, polypropylene, polyethylene terephthalate, polybutylene terephthalate, polyphthalamide, polyester, polyacetal, polyamide, polycarbonate, polyimide, polyether ether ketone, polyaryl ether ketone, polyetherimide, polyamideimide, polybenzimidazole, polyethersulfone, polyphenylene ether, cycloolefin copolymer, polyphenylene sulfide, and polyethylene naphthalene. Such polymers possess high thermal stability, and facilitate surface treatment, thereby making it easy to apply various coating layers. In addition, such polymers are highly flexible and bendable.

The binder includes at least one of the following polymers: poly(vinylidene fluoride-co-hexafluoropropylene), poly(vinylidene fluoride-co-trichloroethylene), polyacrylate, polyacrylic acid, polyacrylic acid sodium salt, polyacrylonitrile, polyvinylpyrrolidone, polyvinyl acetate, poly (ethylene-co-vinyl acetate), polyimide, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, sodium carboxymethyl cellulose, lithium carboxymethyl cellulose, poly(acrylonitrile-co-styrene butadiene), polyvinyl alcohol, polyvinyl ether, polytetrafluoroethylene, polyhexafluoropropylene, poly(styrene-co-butadiene), or polyvinylidene difluoride. Such polymers exert a strong bonding effect to bond inorganic particles together, or bond the separator 23 and the first electrode plate 21/the second electrode plate 22 together to form a whole, thereby increasing the hardness of the electrode assembly 20. Alternatively, in some other embodiments, the binder may further include other polymers.

The inorganic particles include at least one of the following inorganic particles: silicon dioxide, aluminum oxide, titanium oxide, zinc oxide, magnesium oxide, hafnium dioxide, tin oxide, zirconium oxide, yttrium oxide, silicon carbide, boehmite, magnesium hydroxide, aluminum hydroxide, calcium titanate, barium titanate, lithium phosphate, lithium titanium phosphate, and lithium lanthanum titanate. Such inorganic particles has high thermal stability, and improve the high-temperature resistance performance of the electrochemical device 100.

As shown in FIG. 1 and FIG. 2, the electrochemical device 100 further includes a first tab 30 and a second tab 40. The first tab 30 and the second tab 40 are electrically connected to the first current collector 211 and the second current collector 221, respectively, and protrude from the housing 10 to connect to an external component (not shown in the drawing).

Figure 4:
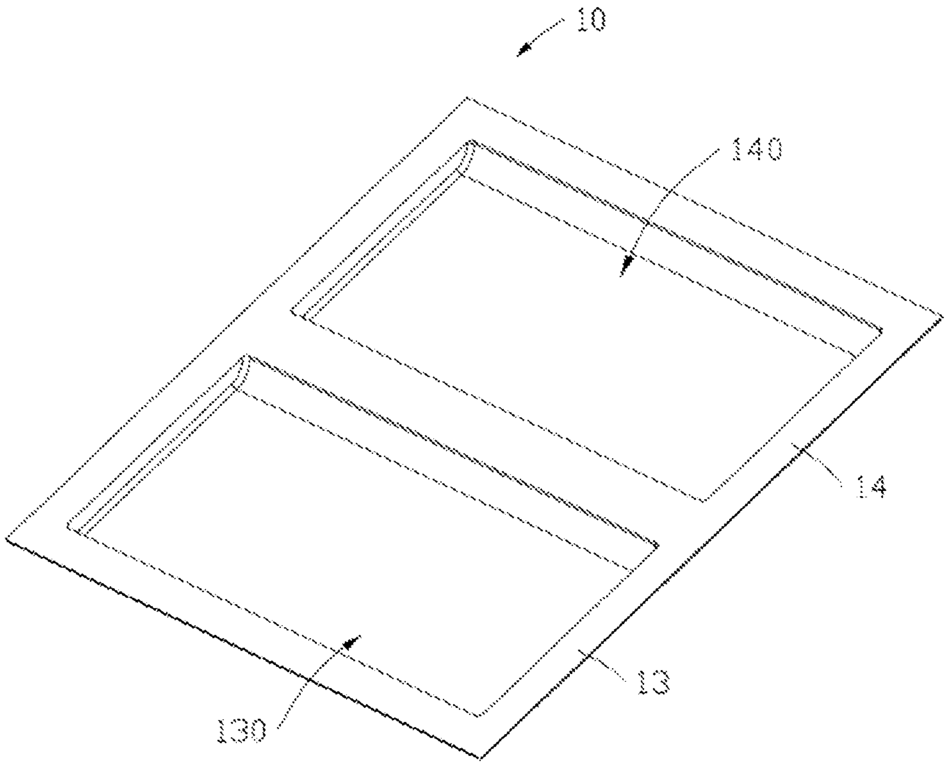
FIG. 4 is a schematic structural diagram of a housing of the electrochemical device shown in FIG. 1 before packaging.

In some embodiments, the housing 10 may be a packaging bag sealed with a sealing film (such as an aluminum laminated film). In other words, the electrochemical device 100 may be a pouch-type cell. Referring to FIG. 1 and FIG. 4. the housing 10 includes a body portion 11 configured to accommodate the electrode assembly 20, and a seal edge 12 connected to the body portion 11. The first tab 30 and the second tab 40 protrude from the seal edge 12. The housing 10 may be formed by heat-sealing the first sealing film 13 and the second sealing film 14. The first sealing film 13 is provided with a first pit 130, and the second sealing film 14 is provided with a second pit 140. In this way, after the first sealing film 13 and the second sealing film 14 are heat-sealed, the first pit 130 fits with the second pit 140 to form an accommodation space for accommodating the electrode assembly 20. Alternatively, the first sealing film 13 may be a flat structure. After the first sealing film 13 and the second sealing film 14 are heat-sealed, the first sealing film 13 closes off the second pit 140 of the second sealing film 14 to form an accommodation space for accommodating the electrode assembly 20. In other embodiments, not limited to a pouch-type cell, the electrochemical device 100 may be a steel- or aluminum-shell cell or the like, without being limited in this application.

As shown in FIG. 2 and FIG. 3, the electrochemical device 100 further includes a first bonding piece 50. The first bonding piece bonds the housing 10 and the electrode assembly 20 together. It is defined that a bonding strength between the first bonding piece 50 and the housing 10 is $F_1$, and a bonding strength between the first bonding piece 50 and the electrode assembly 20 is $F_2$. The bonding strength $F_1$ between the first bonding piece 50 and the housing 10 is less than the bonding strength $F_2$ between the first bonding piece 50 and the electrode assembly 20. More specifically, $F_1$ and $F_2$ satisfy: $5\% \leq F_1/F_2 \leq 70\%$, and $15\ \text{N/m} \leq F_1 \leq 500\ \text{N/m}$.

In this application, due to the first bonding piece 50 disposed, the electrode assembly 20 and the housing 10 are bonded and fixed together, thereby suppressing the wobble of the electrode assembly 20 in the housing 10 during mechanical abuse (drop, collision, or vibration), and reducing the hazards of electrolyte leakage, short circuits, and fire caused by the housing 10 burst open. Moreover, because the current collector of the electrode plate is of relatively high hardness, this application sets $F_1$ and $F_2$ to satisfy a specified relationship, so as to not only ensure firm bonding of the first bonding piece 50 to the housing 10 and the electrode assembly 20, but also ensure that the first bonding piece 50 can be de-bonded from the housing 10 in time to release a stress and reduce the hazard of tearing the current collector of the electrode plate in a case that the stress transmitted to the electrode assembly 20 is relatively large when the electrode assembly 20 wobbles in the housing 10 and pulls the first bonding piece 50 during mechanical abuse.

When $F_1/F_2$ is less than 5%, $F_1$ is relatively small, thereby resulting in weak bonding between the electrode assembly 20 and the housing 10, aggravating the wobble of the electrode assembly 20 in the housing 10 during mechanical abuse, and increasing the hazards of electrolyte leakage, short circuits, and fire caused by the housing 10 burst open. Conversely, when $F_1/F_2$ is greater than 70%, $F_2$ is relatively small, thereby resulting in weak bonding between the electrode assembly 20 and the housing 10, aggravating the wobble of the electrode assembly 20 in the housing 10 during mechanical abuse, and increasing the hazards of electrolyte leakage, short circuits, and fire caused by the housing 10 burst open; or, $F_1$ is relatively large, and therefore, the first bonding piece 50 fails to be de-bonded from the housing 10 in time to release a stress in a case that the stress transmitted to the electrode assembly 20 is relatively large during mechanical abuse, thereby also increasing the hazard of tearing the current collector of the electrode plate.

When $F_1$ is less than 15 N/m, the bonding between the electrode assembly 20 and the housing 10 is weak, thereby aggravating the wobble of the electrode assembly 20 in the housing 10 during mechanical abuse, and increasing the hazards of electrolyte leakage, short circuits, and fire caused by the housing 10 burst open. Conversely, when $F_1$ is greater than 500 N/m, the first bonding piece 50 fails to be de-bonded from the housing 10 in time to release a stress in a case that the stress transmitted to the electrode assembly 20 is relatively large during mechanical abuse, thereby also increasing the hazard of tearing the current collector of the electrode plate.

Figure 5:
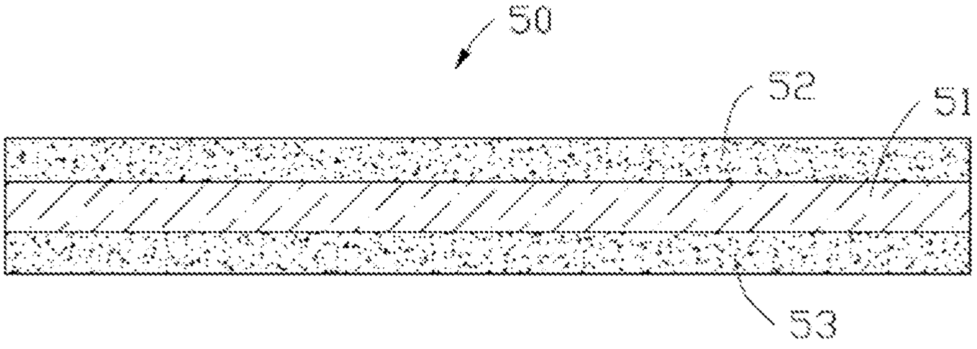
FIG. 5 is a cross-sectional view of a first bonding piece of the electrochemical device shown in FIG. 3.

Referring to FIG. 5, in some embodiments, the first bonding piece 50 may be double-sided tape. The first bonding piece 50 includes a substrate layer 51, a first bonding layer 52 and a second bonding layer 53, the first bonding layer 52 and the second bonding layer 53 are disposed on two sides of the substrate layer 51. The first bonding layer 52 bonds the substrate layer 51 to the housing 10. In this way, the bonding strength $F_1$ between the first bonding piece 50 and the housing 10 is the bonding strength between the first bonding layer 52 and the housing 10. The second bonding layer 53 bonds the substrate layer 51 to the electrode assembly 20. In this way, the bonding strength $F_2$ between the first bonding piece 50 and the electrode assembly 20 is the bonding strength between the second bonding layer 53 and the electrode assembly 20. By arranging the first bonding piece 50 as a three-layer structure, the bonding strength is caused to be different between the two sides of the first bonding piece 50. In some embodiments, the substrate layer 51 may be one or more selected from polypropylene, polyimide, polyethylene terephthalate, polytetrafluoroethylene, polyvinyl chloride, or polyethylene. In some embodiments, the first bonding layer 52 and the second bonding layer 53 each may be one or more independently selected from acrylate, polyurethane, rubber, or silicone. In some other embodiments, the first bonding piece 50 may be a hot-melt adhesive. The hot melt adhesive may be one or more selected from polyolefin hot-melt adhesive, polyurethane hot-melt adhesive, hot-melt adhesive of ethylene or a copolymer thereof, polyester hot-melt adhesive, polyamide hot-melt adhesive, hot-melt adhesive of styrene or a block copolymer thereof, without being limited in this application.

As shown in FIG. 3, the electrode assembly 20 is of a wound structure. The electrode assembly 20 possesses a winding axis C perpendicular to the paper surface. The winding direction $D_1$ is a direction of counterclockwise rotation along the winding axis C shown in FIG. 3. In the winding direction $D_1$, the electrode assembly 20 includes a first section 201, a first bend section 202, a second section 203, and a second bend section 204 that are connected sequentially. In some embodiments, the first section 201 and second section 203 may be flat straight sections that are parallel to each other. In other embodiments, the first section 201 and the second section 203 may be bent sections, but without being limited in this application.

In some embodiments, the electrode assembly 20 ends with the separator 23, and the outermost coil of the first section 201 is the separator 23. Understandably, that the outermost coil of the first section 201 is the separator 23 means that the rolled outermost coil (outermost layer) of the first section 201 in the wound structure is the separator 23. The first bonding piece 50 bonds the housing 10 to the outermost separator 23 of the first section 201, which means that the outermost separator 23 of the first section 201 is bonded and fixed to the housing 10.

Understandably, in this application, the meanings of the outermost coil of the first bend section 202, the outermost coil of the second section 203, and the outermost coil of the second bend section 204 each are similar to the meaning of the outermost coil of the first section 201, and denote the part located in the outermost coil (outermost layer) in the wound structure thereof. In some embodiments, the outermost coil may be an electrode plate, for example, the first electrode plate 21 or the second electrode plate 22. In some embodiments, the outermost coil may be the separator 23.

If the electrode assembly uses the first current collector (such as an aluminum foil) as an ending section, the first current collector can increase the hardness of the electrode assembly to protect the electrode assembly. Moreover, in order to reduce the relative movement of the electrode assembly in the housing, the aluminum foil ending section needs to be bonded to the inner surface of the housing through an adhesive layer, so as to implement relative fixing between the electrode assembly and the housing. When the electrochemical device is mounted inside an electronic device, another adhesive layer is usually required to bond a side of the housing to the inner side of the electronic device, where the side corresponds to the aluminum foil ending section. In this case, when the electronic device is mechanically abused, the adhesive layer between the electronic device and the housing will pull the housing to generate a stress. The stress is transmitted to the ending part of the aluminum foil so that the aluminum foil ending section is torn. In addition, when wobbling in the housing, the electrode assembly also pulls the aluminum foil ending section, thereby also tearing the aluminum foil ending section. The torn aluminum foil is prone to pierce the separator and cause a short circuit. On the other hand, after the aluminum foil is torn, the electrode assembly drifts in the housing more violently, and exerts an impact force on the housing. Especially, when the electrochemical device is a pouch-type cell, the electrode assembly is more prone to burst the seal edge of the housing and lead to hazards such as electrolyte leakage, short circuits, and fire. This leads to failure of the electrochemical device, and impairs safety of the electrochemical device in use.

In this application, the separator 23 is extended and the electrode assembly ends with the separator 23. The separator 23 is of a higher roughness than the electrode plate, and therefore, can increase the friction force between the electrode assembly 20 and the first bonding piece 50, thereby increasing the bonding strength between the electrode assembly 20 and the first bonding piece 50. In addition, this part of separator 23 can form a protection layer to avoid a short-circuit hazard caused by wear and tear of the electrode plate inside the separator 23 and effectively increase the capability of the electrode assembly 20 in resisting mechanical shocks. In addition, when the electrode assembly 20 wobbles in the housing 10 and pulls the separator 23, the separator 23, which is made of a material that is more flexible than the first current collector 211, is not prone to be torn under stress, thereby alleviating the safety problems caused by potential tearing at the end part of the first current collector 211.

As shown in FIG. 3, in the winding direction $D_1$, the end part 2300 of the separator 23 is located in the first bend section 202. In other words, the separator 23 is not disposed on the outermost coil of the second section 203. The first bonding piece 50 is further adhered to the outermost coil of the first bend section 202, and is adhered to the end part 2300 of the separator 23. In other words, the first bonding piece 50 can also serve as an ending adhesive to fix the end part 2300 of the separator 23. The end part 2300 of the separator 23 is located in the first bend section 202. Therefore, the first bonding piece 50 bonds the outer surface of the first bend section 202, so that the first bonding piece 50 exerts little impact on the thickness of the electrode assembly 20, and avoids increase of the thickness of the electrode assembly 20 caused by the bonding of the first bonding piece 50 to the second section 203. As shown in FIG. 3, the thickness direction H of the electrode assembly 20 is a direction from the second section 203 to the first section 201. The first bonding piece 50 on the outermost coil of the first bend section 202 may also be bonded to the housing 10.

When the end part 2300 of the separator 23 is close to or located at a junction between the first bend section 202 and the first section 201, in order to effectively fix the end part 2300 of the separator 23, the first bonding piece 50 may be extended to bond the outer surface of the outermost coil of the first section 201. When the end part 2300 of the separator 23 is close to or located at a junction between the first bend section 202 and the second section 203, in order to effectively fix the end part 2300 of the separator 23, the first bonding piece 50 may be extended and bonded to the outer surface of the outermost coil of the second section 203.

In some embodiments, the first bonding piece 50 on the outermost coil of the first section 201 is connected to the first bonding piece 50 on the outermost coil of the first bend section 202. The first bonding piece 50 is integrated in one piece, thereby increasing the area of bonding of the first bonding piece 50 to the housing 10 and the electrode assembly 20, and ensuring a desirable bonding strength. Further, in the winding direction $D_1$, a width W of the first bonding piece 50 on the outermost coil of the first section 201 is greater than or equal to 5 mm. When the width W is less than 5 mm, the bonding of the first bonding piece 50 to the electrode assembly 20 and the housing 10 is weak, thereby aggravating the wobble of the electrode assembly 20 in the housing 10 during mechanical abuse, and increasing the hazards of electrolyte leakage, short circuits, and fire caused by the housing 10 burst open. In some other embodiments, the first bonding piece 50 on the outermost coil of the first section 201 may be de-bonded from the first bonding piece 50 on the outermost coil of the first bend section 202 instead.

In some embodiments, the outermost coil of the second section 203 is the first electrode plate 21. The outermost coil of the second section 203 is the first electrode plate 21, and the hardness of the electrode plate is usually high, thereby increasing the hardness of the electrode assembly 20, increasing the capability of the electrode assembly 20 in resisting mechanical shocks, and improving safety. Further, the outermost coil of first electrode plate 21 in the second section 203 may a single-side-coated region. For example, the outermost coil of first electrode plate 21 in the second section 203 may be a positive single-side-coated region. Specifically, the first current collector 211 includes a first surface 2111 and a second surface 2112 opposite to the first surface 2111. The first surface 2111 is not coated with a first active material layer 212. The second surface 2112 is coated with the first active material layer 212. The outer surface of the outermost coil of the second section 203 is the first surface 2111. In this case, the first bonding piece 50 is adhered to the first surface 2111. In other embodiments, the polarities of the first electrode plate 21 and the second electrode plate 22 are interchanged. In this case, the outermost coil of first electrode plate 21 in the first section 201 may be a negative single-side-coated region.

As shown in FIG. 3, in some embodiments, in the winding direction $D_1$, the end part 2300 of the first electrode plate 21 is located in the second section 203. The first bonding piece 50 is further adhered to the outermost coil of the second bend section 204 and is adhered to the end part 2100 of the first electrode plate 21. In other words, the first bonding piece 50 may also serve as an ending adhesive to fix the end part 2100 of the first electrode plate 21. The end part 2100 of the first electrode plate 21 may be close to or located at the junction between the second section 203 and the second bend section 204, thereby improving the flatness of the electrode assembly 20 and increasing the energy density of the electrochemical device 100.

As shown in FIG. 3, further, in the winding direction $D_1$, the end part 2200 of the second electrode plate 22 may be located in the second section 203 instead. To be specific, along the winding direction $D_1$, the separator 23 exceeds the end part 2100 of the first electrode plate 21 and the end part 2200 of the second electrode plate 22, and is further disposed in the second bend section 204, the first section 201, and the first bend section 202. The outermost coil of the second section 203 is the first electrode plate 21. Therefore, in this case, the separator 23 exceeds the end part 2100 of the first electrode plate 21 and the end part 2200 of the second electrode plate 22 by less than one coil. Understandably, when the first electrode plate 21 is a positive electrode plate and the second electrode plate 22 is a negative electrode plate, in order to reduce the hazards of lithium plating, the end part 2200 of the second electrode plate 22 may exceed the end part 2100 of the first electrode plate 21 along the winding direction $D_1$.

In other embodiments, the end part 2200 of the second electrode plate 22 may exceed the end part 2100 of the first electrode plate 21 and be located in the first section 201 instead. This is not limited in this application.

Figure 6:
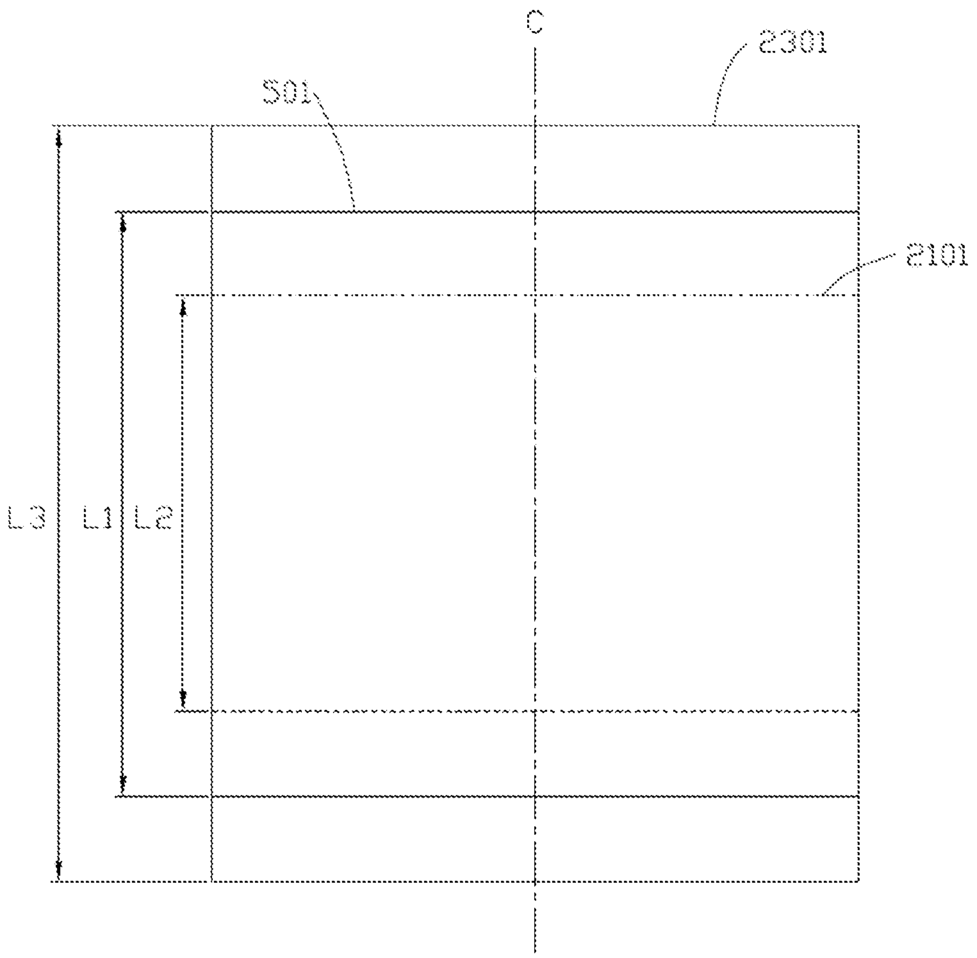
FIG. 6 is a left view of the electrochemical device shown in FIG. 2 and stripped of a housing.

Referring to FIG. 6, in some embodiments, in the direction of the winding axis C of the electrode assembly 20, the length of the first bonding piece 50 is $L_1$ (mm), the length of the first electrode plate 21 is $L_2$ (mm), and the length of the separator 23 is $L_3$ (mm), and therefore, $L_1$, $L_2$, and $L_3$ satisfy: $L_2-20 \leq L_1 \leq L_3+20$. To be specific, referring to FIG. 7 and FIG. 8, in the direction $D_2$ perpendicular to the winding axis C, at an end of the electrode assembly, the length by which the edge 2301 of the separator 23 exceeds the edge 501 of the first bonding piece 50 is less than or equal to 10 mm, and the length by which the edge 2101 of the first electrode plate 21 exceeds the edge 501 of the first bonding piece 50 is less than or equal to 10 mm. Therefore, such arrangement prevents the first bonding piece 50 from entering the seal edge 12 of the housing 10 due to excessive $L_1$, and therefore, avoids the hazards of a decrease in the sealing strength or proneness to electrolyte leakage at a seal edge 12 of the housing. Such arrangement also avoids weak bonding caused by deficient $L_1$, where the weak bonding aggravates the wobble of the electrode assembly 20 in the housing 10 during mechanical abuse, and increases the hazards of electrolyte leakage, short circuits, and fire caused by the housing 10 burst open.

In some embodiments, the lengths satisfy $L_2 \leq L_1 \leq L_3$. To be specific, at an end of the electrode assembly, the projection of the edge 501 of the first bonding piece 50 is located between the projection of the edge 2101 of the first electrode plate 21 and the projection of the edge 2301 of the separator 23. Therefore, the first bonding piece 50 can fix the separator 23 and reduce the short-circuit hazards caused by contact between the first electrode plate 21 and the second electrode plate 22 when the separator 23 shrinks during mechanical abuse. In addition, the edge 501 of the first bonding piece 50 does not exceed the edge 2301 of the separator 23, thereby further reducing the hazards of a decrease in the sealing strength or proneness to electrolyte leakage at a seal edge 12 of the housing, where the hazards occur because a protruding part by which the first bonding piece 50 protrudes beyond the separator 23 enters the seal edge 12 of the housing 10.

Figure 7:
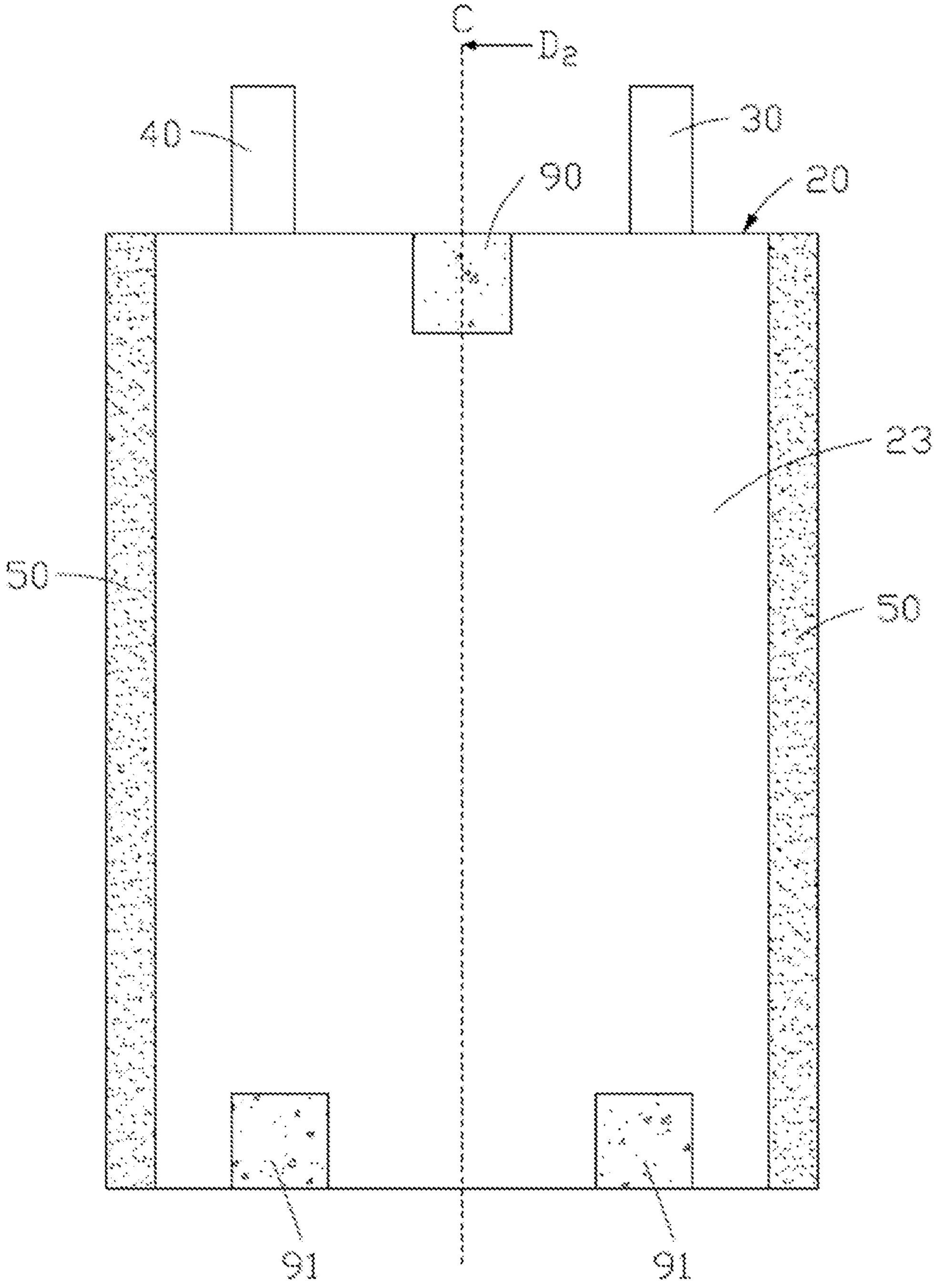
FIG. 7 is a rear view of the electrochemical device shown in FIG. 2 and stripped of a housing.
Figure 8:
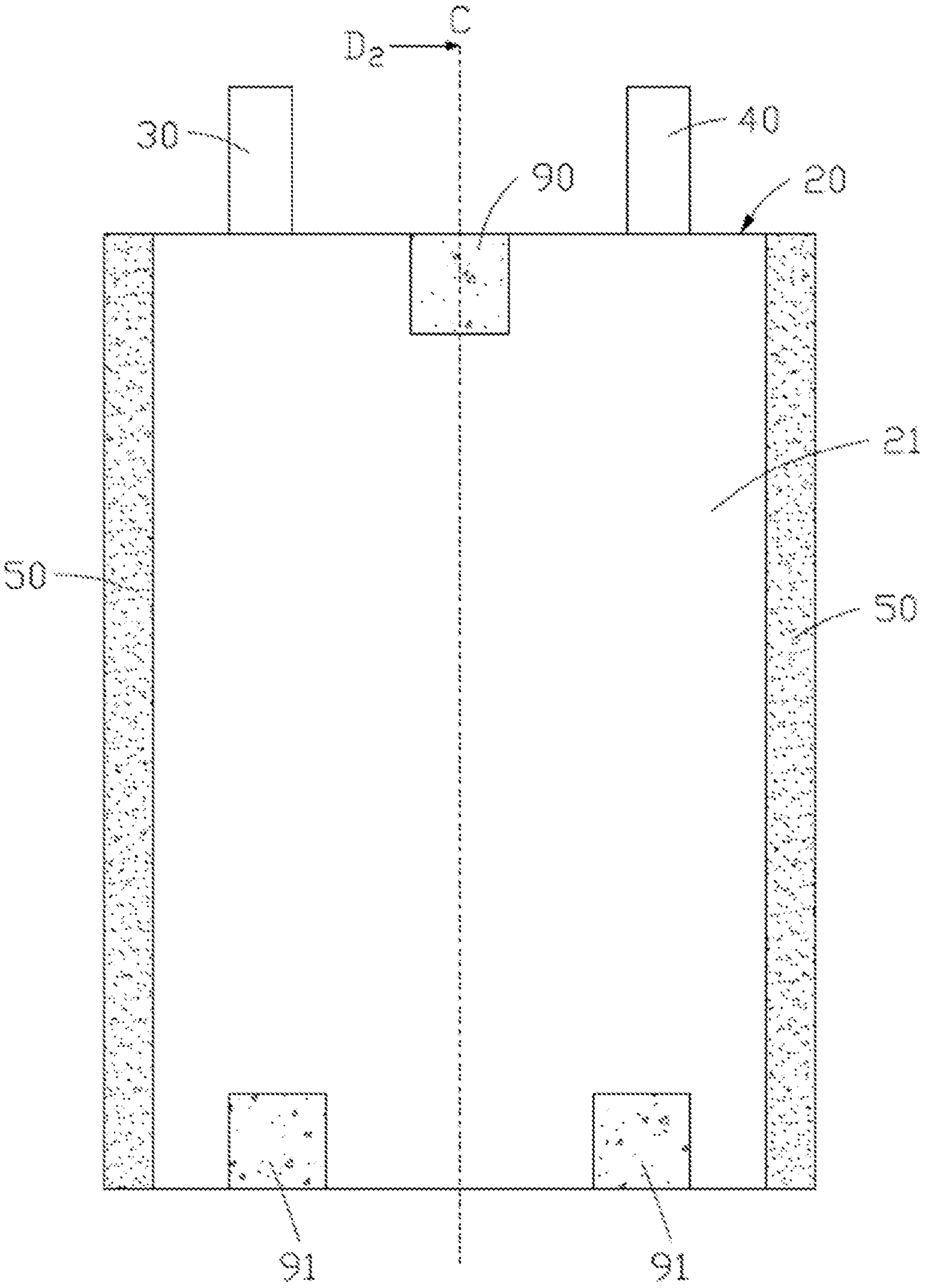
FIG. 8 is a front view of the electrochemical device shown in FIG. 2 and stripped of a housing.

Referring to FIG. 7 and FIG. 8, in some embodiments, the electrochemical device 100 further includes head adhesive tape 90 and end adhesive tape 91. The head adhesive tape 90 is disposed at the head of the electrode assembly 20, where the first tab 30 and the second tab 40 are located, and bonds the edge of the separator 23 to the outermost coil of the second section 203. The end adhesive tape 91 is disposed at the end part of the electrode assembly 20, and bonds the edge of the separator 23 to the outermost coil of the second section 203. In this way, the head adhesive tape 90 and the end adhesive tape 91 can prevent the separator 23 from pleating or shrinking, where the pleats and shrinkage may lead to direct contact between the first electrode plate 21 and the second electrode plate 22 to result in short circuits.

Figure 9:
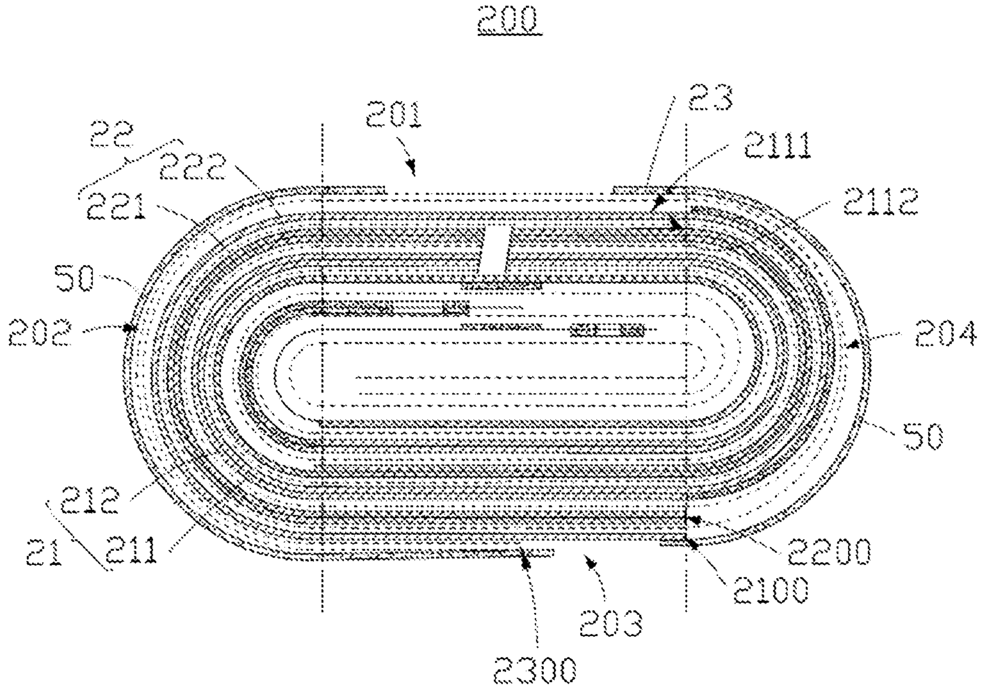
FIG. 9 is a cross-sectional view of an electrochemical device according to another embodiment of this application.

Referring to FIG. 9, another embodiment of this application further provides an electrochemical device 200. The electrochemical device in this embodiment differs from the electrochemical device 100 in that the end part of the separator 23 may be located in the second section 203 instead. In this case, in order to effectively fix the end part 2300 of the separator 23, the first bonding piece 50 is further bonded to the outermost coil of the second section 203, and bonded to the end part 2300 of the separator 23.

Figure 10:
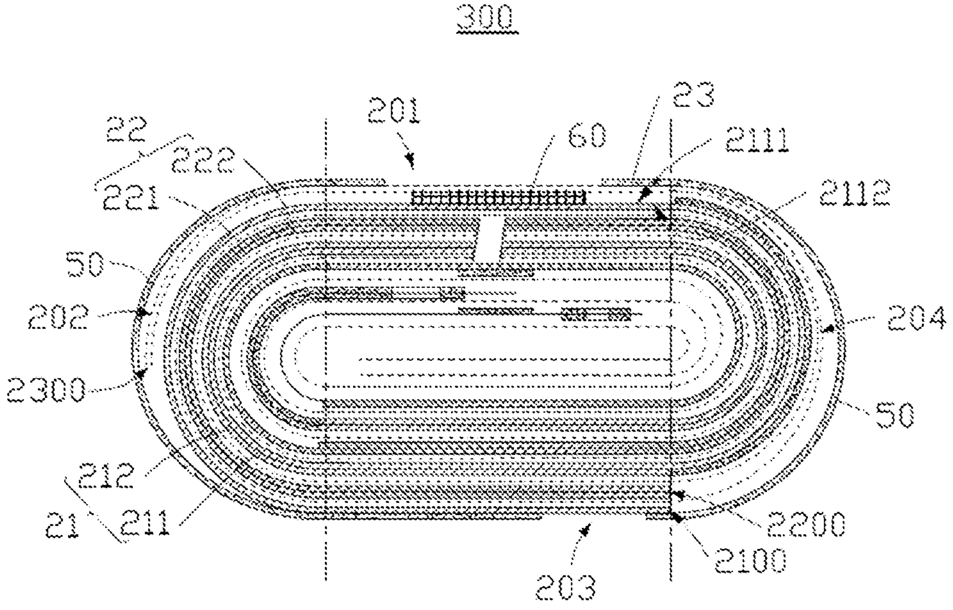
FIG. 10 is a cross-sectional view of an electrochemical device according to still another embodiment of this application.

Referring to FIG. 10, another embodiment of this application further provides an electrochemical device 300. The electrochemical device in this embodiment differs from the electrochemical device 100 in that, in some embodiments, the electrochemical device 300 further includes a second bonding piece 60. The second bonding piece 60 bonds the outermost electrode plate of the first section 201 together with the separator 23 located outside the outermost electrode plate of the first section 201. That is, the separator 23 outside the outermost electrode plate of the first section 201 is bonded and fixed to the outermost electrode plate of the first section 201.

In this application, the outermost electrode plate means the outermost coil (outermost layer) of the electrode plate in the wound structure, that is, the electrode plate closest to the outermost coil (outermost layer) of the wound structure. In some embodiments, the outermost coil of the first section 201 may be the separator 23. In this case, the outermost electrode plate of the first section 201 means the electrode plate closest to the outermost coil, and may be the first electrode plate 21 or the second electrode plate 22. In some embodiments, the outermost coil of the first section 201 may be the first electrode plate 21. In this case, the outermost electrode plate of the first section 201 is the said first electrode plate 21.

The outermost electrode plate of the first section 201 is the first electrode plate 21. Further, the outermost coil of first electrode plate 21 in the first section 201 may a single-side-coated region. Specifically, the outer surface of the outermost coil of the first section 201 is the first surface 2111 of the first current collector 211. In this case, the second bonding piece 60 bonds the first surface 2111 and the separator 23 together.

In some other embodiments, the second bonding piece 60 may be omitted. In this case, the coating of the separator 23 may be directly bonded to the outermost electrode plate of the first section 201. A bonding strength between the coating on the separator 23 and the outermost electrode plate of the first section 201 may be greater than or equal to 3 N/m.

Figure 11:
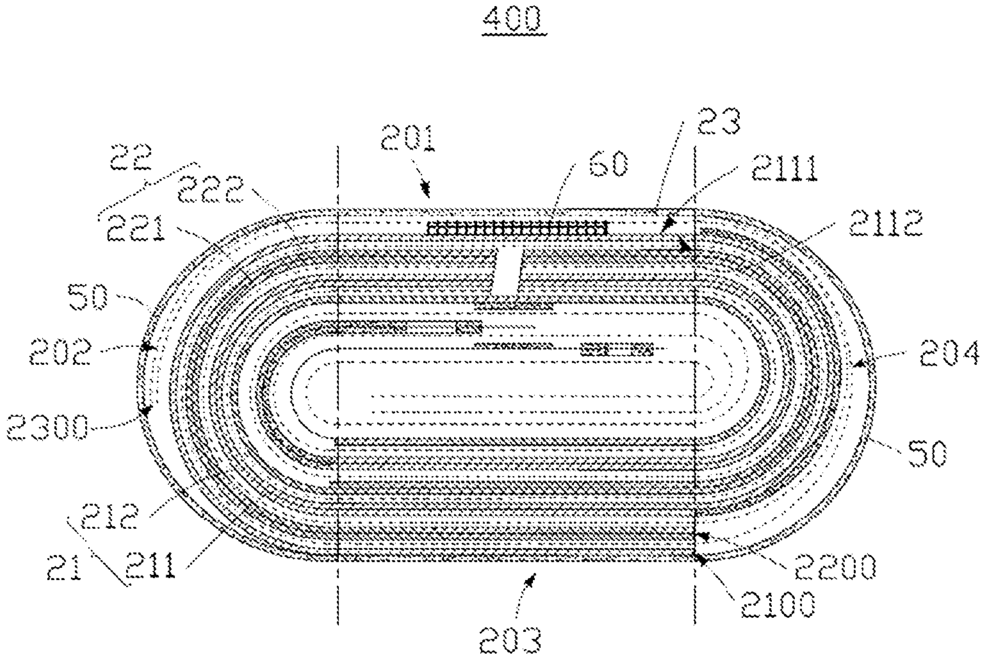
FIG. 11 is a cross-sectional view of an electrochemical device according to yet another embodiment of this application.

Referring to FIG. 11, another embodiment of this application further provides an electrochemical device 400. This electrochemical device differs from the electrochemical device 300 in that the first bonding piece 50 on the outermost coil of the first section 201, the first bonding piece 50 on the outermost coil of the first bend section 202, the first bonding piece 50 on the outermost coil of the second section 203, and the first bonding piece 50 on the outermost coil of the second bend section 204 are connected sequentially. In this case, the first bonding piece 50 surrounds the entire outer surface of the electrode assembly 20.

The electrochemical device 100 (or electrochemical device 200, 300, or 400) according to this application includes any device capable of electrochemical reactions.

Specifically, the electrochemical device 100 includes all types of primary batteries, secondary batteries, fuel cells, solar cells, and capacitors (such as supercapacitors). Optionally, the electrochemical device 100 may be a lithium secondary battery, including a lithium metal secondary battery, a lithium-ion secondary battery, a lithium polymer secondary battery, and a lithium-ion polymer secondary battery.

Figure 12:
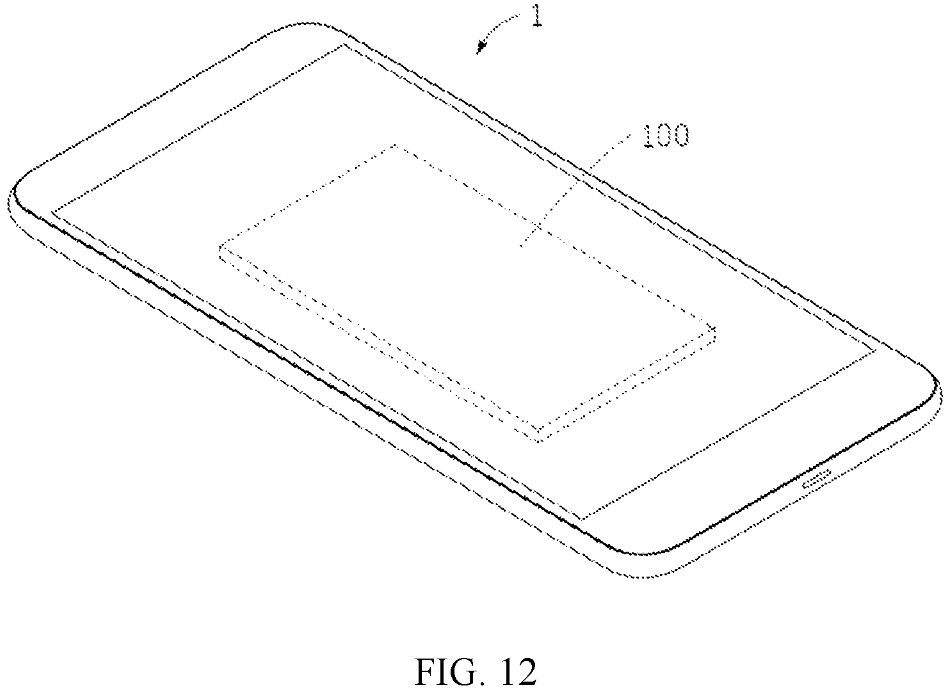
FIG. 12 is an overall schematic structural diagram of an electronic device according to an embodiment of this application.
Figure 13:
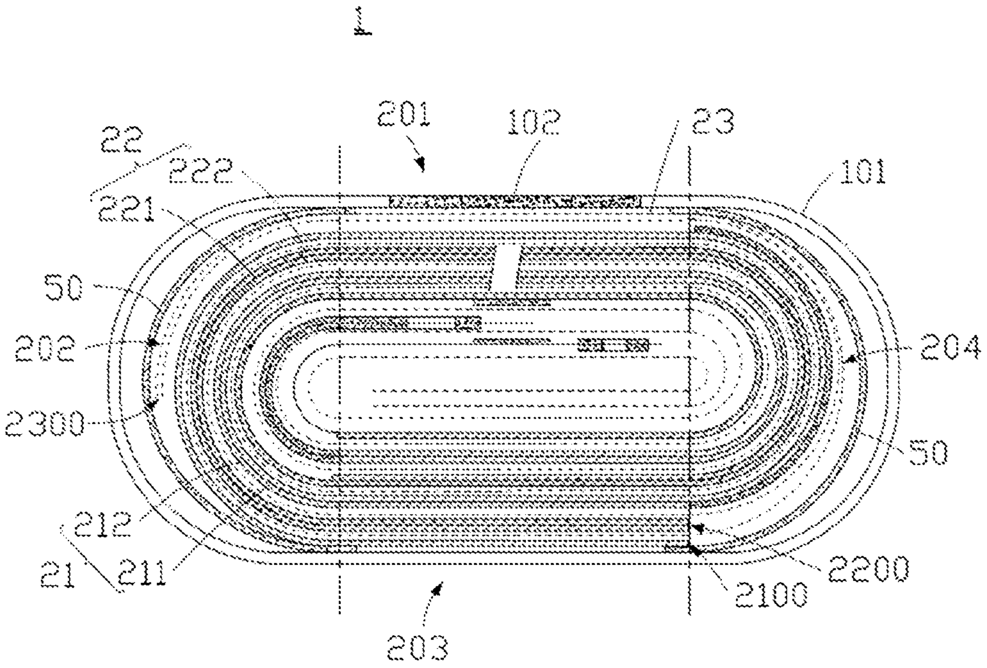
FIG. 13 is a cross-sectional view of the electronic device shown in FIG. 12.

Referring to FIG. 12 and FIG. 13, an embodiment of this application further provides an electronic device 1. The electronic device 1 includes an electrochemical device 100 (or electrochemical device 200, 300, or 400), an accommodation chamber 101, and a third bonding piece 102. The electrochemical device 100 is disposed in the accommodation chamber 101, and the third bonding piece 102 bonds the housing 10 oriented toward the first section 201 together with the accommodation chamber 101. In other words, the third bonding piece 102 bonds and fix the housing 10 to the accommodation chamber 101. The third bonding piece 102 may be double-sided tape or a hot-melt adhesive.

In this application, when the electronic device 1 is subjected to mechanical abuse, the third bonding piece 102 can suppress the wobble of the electrochemical device 100 in the accommodation chamber 101, and the first bonding piece 50 can suppress the wobble of the electrode assembly 20 of the electrochemical device 100 in the housing 10, thereby reducing the hazards of electrolyte leakage, short circuits, or fire caused by the housing 10 burst open. Moreover, in this application, the bonding strength $F_1$ between the first bonding piece 50 and the housing 10 is set to be less than the bonding strength $F_2$ between the first bonding piece 50 and the electrode assembly 20. Therefore, the first bonding piece 50 can be de-bonded from the housing 10 in time to release a stress and reduce the hazard of tearing the current collector of the electrode plate in a case that the stress transmitted to the electrode assembly 20 is relatively large when the electrode assembly 20 wobbles in the housing 10 and pulls the first bonding piece 50 during mechanical abuse.

The electrochemical device 100 according to this application is applicable to electronic devices 1 for use in various fields. In an embodiment, the electronic device 1 according to this application may be, but is not limited to, a laptop computer, pen-inputting computer, mobile computer, e-book player, portable phone, portable fax machine, portable photocopier, portable printer, stereo headset, video recorder, liquid crystal display television set, handheld cleaner, portable CD player, mini CD-ROM, transceiver, electronic notepad, calculator, memory card, portable voice recorder, radio, backup power supply, motor, automobile, motorcycle, power-assisted bicycle, bicycle, lighting appliance, toy, game console, watch, electric tool, flashlight, camera, large household battery, lithium-ion capacitor, or the like.

The following describes this application in detail with reference to specific embodiments and comparative embodiments. This application is described below with reference to a specific preparation process and a test method using a pouch-type cell as an example of the electrochemical device. A person skilled in the art understands that the preparation method described in this application is merely an example. Any other appropriate preparation methods fall within the scope of this application.

Embodiment 1

An electrode assembly of 76 mm in length, 63 mm in width, and 5.2 mm in thickness is adopted. The electrode assembly ends with a separator. The end parts of both the first electrode plate and the second electrode plate are located in the second section. The current collector of the first electrode plate is an aluminum foil. The separator exceeds the end part of the first electrode plate and the end part of the second electrode plate. The outermost coil of the first section is the separator, and the end part of the separator is located in the first bend section.

The first bonding piece is adhered to the aluminum laminated film, and also bonds to the outermost separator of the first section and the outermost separator of the first bend section, and fixes the end part of the separator. Along the winding direction, the width W of the first bonding piece on the outermost coil of the first section is 7 mm. The bonding strength $F_1$ between the first bonding piece and the aluminum laminated film is 20 N/m, and the bonding strength $F_2$ between the first bonding piece and the separator is 400 N/m, that is, $F_1/F_2=5\%$.

The electrode assembly and the electrolyte solution are packaged into the aluminum laminated film to obtain an electrochemical device.

Embodiments 2 to 6

Differences from Embodiment 1 are: In Embodiments 2 to 6, $F_1/F_2$ is different, and Embodiments 2 to 6 satisfy the following condition: $5\% \le F_1/F_2 \le 70\%$.

Embodiments 7 to 15

Differences from Embodiment 6 are: In Embodiments 7 to 13, $F_1$ is different, and Embodiments 7 to 13 satisfy the following condition: $10\ N/m \le F_1 \le 520\ N/m$.

Comparative Embodiments 1 to 2

Differences from Embodiment 1 are: In Comparative Embodiments 1 to 2, $F_1/F_2$ is different, and Comparative Embodiments 1 to 2 satisfy the following condition: $5\% \le F_1/F_2 \le 70\%$.

Embodiments 16 to 20

Differences from Embodiment 6 are: W in Embodiments 16 to 20 is different.

The method for testing the bonding strength of the first bonding piece is: disassembling the electrochemical device, and keeping the bonding interface in good condition between the housing and the electrode assembly; putting the disassembled electrochemical device into a die-cutting machine, and die-cutting the electrode assembly into sample strips of 4 to 8 mm in length; sticking double-sided tape onto a steel sheet, affixing the sample strips of the electrode assembly onto the double-sided tape, and fixing the sample strips securely; fixing a hard paper strip of the same width to one end of a packaging bag firmly to obtain a test sample; fixing one end of the steel sheet onto the lower end of a universal tensile testing machine, pulling the paper strip reversely at an angle of 180° and fixing it onto the upper end of the tensile testing machine, and measuring the bonding strength at a speed of 50 mm/min; recording an average value of the measured values in a steady section of a tension curve after the bonding strength is measured; and testing 10 samples concurrently in each group.

A drop test is performed on the electrochemical device in each embodiment and each comparative embodiment, and the corresponding drop test results are recorded in Table 1. Every 10 electrochemical devices prepared in each embodiment and each comparative embodiment are tested in a group. A specific method of the drop test is: fully charging the battery first, adjusting the SOC (State of Charge, state of charge) to 100%, leaving the battery to stand for 2 hours, and then measuring the voltage and internal resistance of the battery before dropping; putting the battery into a jig chamber, and putting a 1 mm-thick silicone pad on the surface of the battery, pressing the battery with a 5 kg pressing block for 12 hours, and then mounting the top cover plate of the jig chamber; dropping the jig chamber containing the battery from a 1.8 meter height to the steel sheet for 7 rounds by using an automatic dropping device, where, in each round, the head part, the end part, the upper right corner, the lower right corner, the upper left corner, and the lower left corner of the jig chamber land on the steel sheet respectively, so that the battery is dropped for 42 times in total; measuring the voltage of the battery after each round of dropping; stopping dropping when the battery catches fire, heats up, leaks electrolyte, or incurs a voltage drop greater than or equal to 50 mV; if none of such phenomena occurs, keeping the dropping test until 7 rounds of dropping is completed; disassembling the cell after completion of 7 rounds of dropping, and determining the percentage of tearing of the aluminum foil, the percentage of burst of the seal edge of the housing, and the percentage of short circuits.

TABLE 1

| | Bonding strength $F_1$ (N/m) | $F_1/F_2$ (%) | W (mm) | Percentage of tearing of aluminum foil | Percentage of burst of seal edge | Percentage of short circuits |
|---|---|---|---|---|---|---|
| Embodiment 1 | 20 | 5 | 7 | 5/10 | 5/10 | 5/10 |
| Embodiment 2 | 20 | 15 | 7 | 4/10 | 5/10 | 4/10 |
| Embodiment 3 | 20 | 25 | 7 | 0/10 | 0/10 | 0/10 |
| Embodiment 4 | 20 | 40 | 7 | 0/10 | 0/10 | 0/10 |
| Embodiment 5 | 20 | 55 | 7 | 0/10 | 0/10 | 0/10 |
| Embodiment 6 | 20 | 70 | 7 | 4/10 | 4/10 | 3/10 |
| Embodiment 7 | 10 | 70 | 7 | 7/10 | 6/10 | 6/10 |
| Embodiment 8 | 15 | 70 | 7 | 5/10 | 5/10 | 4/10 |
| Embodiment 9 | 30 | 70 | 7 | 0/10 | 0/10 | 0/10 |
| Embodiment 10 | 80 | 70 | 7 | 0/10 | 0/10 | 0/10 |
| Embodiment 11 | 200 | 70 | 7 | 0/10 | 0/10 | 0/10 |
| Embodiment 12 | 300 | 70 | 7 | 0/10 | 0/10 | 0/10 |
| Embodiment 13 | 400 | 70 | 7 | 3/10 | 3/10 | 3/10 |
| Embodiment 14 | 500 | 70 | 7 | 4/10 | 3/10 | 3/10 |
| Embodiment 15 | 520 | 70 | 7 | 5/10 | 4/10 | 5/10 |
| Comparative Embodiment 1 | 20 | 3 | 7 | 10/10 | 10/10 | 10/10 |
| Comparative Embodiment 2 | 20 | 75 | 7 | 10/10 | 10/10 | 10/10 |
| Embodiment 16 | 20 | 70 | 5 | 4/10 | 4/10 | 3/10 |
| Embodiment 17 | 20 | 70 | 10 | 0/10 | 0/10 | 0/10 |
| Embodiment 18 | 20 | 70 | 11 | 0/10 | 0/10 | 0/10 |
| Embodiment 19 | 20 | 70 | 2 | 6/10 | 6/10 | 5/10 |
| Embodiment 20 | 20 | 70 | 3 | 5/10 | 6/10 | 4/10 |

In Table 1, if the percentage of tearing of the aluminum foil is 0/10, it indicates that among the 10 electrochemical devices tested, the number of electrochemical devices with the aluminum foil being torn is 0. If the percentage of tearing of the aluminum foil is 10/10, it indicates that among the 10 electrochemical devices tested, the number of electrochemical devices with the aluminum foil being torn is 10. The meanings of other values can be deduced similarly.

As can be seen from the data in Table 1, the percentage of tearing of the aluminum foil, the percentage of burst of the seal edge, and the percentage of short circuits of the dropped electrochemical devices in Embodiments 1 to 13 are lower than those in Comparative Embodiments 1 to 4. This indicates that, in Embodiments 1 to 13, when the first bonding piece satisfies: $5\% \leq F_1/F_2 \leq 70\%$ and $15\ N/m \leq F_1 \leq 500\ N/m$, the anti-drop performance of the electrochemical device is improved, and the safety is also improved significantly. Further, the electrochemical device satisfies $25\% \leq F_1/F_2 \leq 55\%$, and the anti-drop performance of the electrochemical device is further improved. When the electrochemical device satisfies $30\ N/m \leq F_1 \leq 300\ N/m$, the safety performance of the electrochemical device is further improved.

Compared with Embodiment 6, Embodiments 14 to 16 satisfy W≥5 mm, so that the anti-drop performance of the electrochemical device is relatively high as well. In Embodiments 17 to 18, W is less than 5 mm, making the safety performance be lower than that in Embodiments 14 to 16.

Finally, it is hereby noted that the foregoing embodiments are merely intended for describing the technical solutions of this application but not intended as a limitation. Although this application is described in detail with reference to the foregoing optional embodiments, a person of ordinary skill in the art understands that modifications or equivalent replacements may be made to the technical solutions of this application without departing from the spirit and scope of the technical solutions of this application.

What is claimed is:

1. An electrochemical device, comprising:

a housing;

an electrode assembly located in the housing;

a first bonding piece bonding the housing and the electrode assembly together, wherein a bonding strength between the first bonding piece and the housing is $F_1$, and a bonding strength between the first bonding piece and the electrode assembly is $F_2$, $5\% \leq F_1/F_2 \leq 70\%$, and $15\ N/m \leq F_1 \leq 500\ N/m$.

2. The electrochemical device according to claim 1, wherein $25\% \leq F_1/F_2 \leq 55\%$.

3. The electrochemical device according to claim 1, wherein $30\ N/m \leq F_1 \leq 300\ N/m$.

4. The electrochemical device according to claim 1, wherein the first bonding piece comprises a substrate layer, a first bonding layer and a second bonding layer; the first bonding layer and the second bonding layer are disposed on two sides of the substrate layer, the first bonding layer bonds the substrate layer to the housing, and the second bonding layer bonds the substrate layer to the electrode assembly.

5. The electrochemical device according to claim 1, wherein the electrode assembly comprises a first electrode plate, a second electrode plate and a separator; the separator is disposed between the first electrode plate and the second electrode plate, and the electrode assembly is of a wound structure;

in a winding direction, the electrode assembly comprises a first section, a first bend section, a second section, and a second bend section connected sequentially, and an outermost coil of the first section is the separator; and the first bonding piece bonds the housing to the outermost coil of the first section.

6. The electrochemical device according to claim 5, wherein, in the winding direction, a width of the first bonding piece on the outermost coil of the first section is greater than or equal to 5 mm.

7. The electrochemical device according to claim 5, wherein, in the winding direction, an end part of the separator is located at the first bend section, and the first bonding piece is further adhered to the outermost coil of the first bend section and adhered to the end part of the separator.

8. The electrochemical device according to claim 7, wherein the first bonding piece on the outermost coil of the first section is connected to the first bonding piece on the outermost coil of the first bend section.

9. The electrochemical device according to claim 5, wherein, in the winding direction, an end part of the separator is located at the second section; and the first bonding piece is further adhered to the outermost coil of the first bend section and the outermost coil of the second section, and adhered to the end part of the separator.

10. The electrochemical device according to claim 9, wherein the outermost coil of the second section is the first electrode plate, the first electrode plate comprises a first current collector and a first active material layer disposed on the first current collector; the first current collector comprises a first surface, an outer surface of the outermost coil of the second section is the first surface, and the first bonding piece is further adhered to the first surface.

11. The electrochemical device according to claim 10, wherein, in the winding direction, an end part of the first electrode plate is located at the second section, and the first bonding piece is further adhered to the outermost coil of the second bend section and adhered to the end part of the first electrode plate.

12. The electrochemical device according to claim 5, further comprising a second bonding piece configured to bond an outermost electrode plate of the first section together with the separator located outside the outermost electrode plate of the first section.

13. The electrochemical device according to claim 5, wherein, in a direction perpendicular to a winding axis of the electrode assembly, at an end of the electrode assembly, a projection of an edge of the first bonding piece is located between a projection of an edge of the first electrode plate and a projection of an edge of the separator.

14. The electrochemical device according to claim 1, wherein the electrochemical device is a pouch-type cell.

15. An electronic device, comprising an electrochemical device, wherein the electrochemical device comprises:

a housing;

an electrode assembly located in the housing;

a first bonding piece bonding the housing and the electrode assembly together, wherein a bonding strength between the first bonding piece and the housing is $F_1$, and a bonding strength between the first bonding piece and the electrode assembly is $F_2$, $5\% \leq F_1/F_2 \leq 70\%$, and $15\ N/m \leq F_1 \leq 500\ N/m$;

wherein the electronic device further comprises an accommodation chamber and a third bonding piece, the electrochemical device is disposed in the accommodation chamber, and the third bonding piece is configured to bond the housing oriented toward the first section together with the accommodation chamber.

16. The electronic device according to claim 15, wherein $25\% \leq F_1/F_2 \leq 55\%$.

17. The electronic device according to claim 15, wherein $30\ N/m \leq F_1 \leq 300\ N/m$.

18. The electronic device according to claim 15, wherein the first bonding piece comprises a substrate layer, a first bonding layer and a second bonding layer; the first bonding layer and the second bonding layer are disposed on two sides of the substrate layer, the first bonding layer bonds the substrate layer to the housing, and the second bonding layer bonds the substrate layer to the electrode assembly.

19. The electronic device according to claim 15, the electrode assembly comprises a first electrode plate, a second electrode plate and a separator; the separator is disposed between the first electrode plate and the second electrode plate, and the electrode assembly is of a wound structure;

in a winding direction, the electrode assembly comprises a first section, a first bend section, a second section, and a second bend section connected sequentially, and an outermost coil of the first section is the separator; and the first bonding piece bonds the housing to the outermost coil of the first section.

20. The electronic device according to claim 15, wherein, in the winding direction, a width of the first bonding piece on the outermost coil of the first section is greater than or equal to 5 mm.

* * * * *